US012143772B2

(12) United States Patent
Wang et al.

(10) Patent No.: US 12,143,772 B2
(45) Date of Patent: Nov. 12, 2024

(54) SILICON-BASED MICROPHONE DEVICE AND ELECTRONIC DEVICE

(71) Applicant: GMEMS Tech Shenzhen Limited, Shenzhen Guangdong (CN)

(72) Inventors: Yunlong Wang, Shenzhen Guangdong (CN); Guanghua Wu, Shenzhen Guangdong (CN); Xingshuo Lan, Shenzhen Guangdong (CN)

( * ) Notice: Subject to any disclaimer, the term of this patent is extended or adjusted under 35 U.S.C. 154(b) by 210 days.

(21) Appl. No.: 17/922,697

(22) PCT Filed: Feb. 7, 2021

(86) PCT No.: PCT/CN2021/075876
§ 371 (c)(1),
(2) Date: Nov. 1, 2022

(87) PCT Pub. No.: WO2021/248928
PCT Pub. Date: Dec. 16, 2021

(65) Prior Publication Data

US 2023/0171551 A1 Jun. 1, 2023

(30) Foreign Application Priority Data

Jun. 9, 2020 (CN) ......................... 202010526138.0

(51) Int. Cl.
*H04R 19/04* (2006.01)
*H04R 1/02* (2006.01)
(Continued)

(52) U.S. Cl.
CPC ............. *H04R 19/04* (2013.01); *H04R 1/028* (2013.01); *H04R 3/005* (2013.01); *H04R 7/04* (2013.01);
(Continued)

(58) Field of Classification Search
USPC .......................................................... 381/174
See application file for complete search history.

(56) References Cited

U.S. PATENT DOCUMENTS 8,582,788 B2 * 11/2013 Leidl .................... H04R 1/2838 381/174
10,405,106 B2 * 9/2019 Lee ........................ H04R 19/04
(Continued)

FOREIGN PATENT DOCUMENTS

CN 204362303 U 5/2015
CN 204681591 U 9/2015
WO 2012122696 A1 9/2012

OTHER PUBLICATIONS

International Search Report for Application No. PCT/CN2021/075876 mailed May 6, 2021, 2 pages.

*Primary Examiner* — James K Mooney

(57) ABSTRACT

Provided are a silicon-based microphone device and an electronic device. The silicon-based microphone device comprises a circuit board, a shielding housing and at least two differential silicon-based microphone chips, wherein at least two sound inlet holes are provided on the circuit board, the shielding housing covers one side of the circuit board and forms a sound cavity with the circuit board, the silicon-based microphone chips are all located inside the sound cavity, the differential silicon-based microphone chips are respectively disposed at the sound inlet holes, and a back cavity of each differential silicon-based microphone chip is communicated with the sound inlet hole at the corresponding position, each of the differential silicon-based microphone chips comprises a first microphone structure and a second microphone structure, all of the first microphone structures are electrically connected, and all of the second microphone structures are electrically connected.

10 Claims, 2 Drawing Sheets

(51) Int. Cl.
*H04R 3/00* (2006.01)
*H04R 7/04* (2006.01)
*H04R 19/00* (2006.01)

(52) U.S. Cl.
CPC ....... *H04R 19/005* (2013.01); *H04R 2410/03* (2013.01); *H04R 2499/11* (2013.01)

(56) References Cited

U.S. PATENT DOCUMENTS

| | | | |
|---|---|---|---|
| 2010/0111344 | A1 | 5/2010 | Sun et al. |
| 2014/0239352 | A1 | 8/2014 | Wang |
| 2018/0041840 | A1 | 2/2018 | Zheng |

* cited by examiner

SILICON-BASED MICROPHONE DEVICE AND ELECTRONIC DEVICE

CROSS-REFERENCE TO RELATED APPLICATIONS

The present application is a U.S. National entry under 35 U.S.C. § 371 of International Application No. PCT/CN2021/075876, filed Feb. 7, 2021, which claims the benefit of, and priority to, a Chinese patent application No. 202010526138.0 filed on Jun. 9, 2020, and claims the priority of this Chinese patent application, the disclosure of which is hereby incorporated by reference herein in its entirety.

TECHNICAL FIELD

The present disclosure relates to a technical field of acoustic-electrical conversion, and in particular, the present disclosure relates to a silicon-based microphone device and electronic device.

BACKGROUND

With the development of wireless communication, users of terminals such as mobile phones are increasing. As for requirements on a mobile phone, users are not merely satisfied with telephone conversation, and further require a high-quality conversation effect. Especially with the development of mobile multimedia technology, the conversation quality of the mobile phone is more important. A microphone of the mobile phone functions as a voice pickup device of the mobile phone, and design thereof directly affects the quality of the call. Currently, the most widely used microphones include traditional electret microphones and silicon-based microphones.

When an existing silicon-based microphone acquires a sound signal, a silicon-based microphone chip in the microphone generates a vibration due to a sound wave acquired therefrom, and the vibration brings about a variation in capacitance that may form an electrical signal, thereby converting the sound wave into an electrical signal to be output. However, the existing silicon-based microphone is still unsatisfactory in dealing with interference of external noise, and improvement of the signal-to-noise ratio is limited, which is not beneficial for improving the audio output effect.

SUMMARY

In view of the shortcomings of the existing methods, a silicon-based microphone device and an electronic device for solving the technical problem of the low signal-to-noise ratio of the existing silicon-based microphones are provided.

In a first aspect, an embodiment of the present disclosure provides a silicon-based microphone device including a circuit board, a shielding housing and at least two differential silicon-based microphone chips, wherein the circuit board is provided with at least two sound inlet holes thereon, the shielding housing covers one side of the circuit board and forming a sound cavity with the circuit board, and each of the differential silicon-based microphone chips is located inside the sound cavity, wherein the differential silicon-based microphone chips are respectively disposed at the sound inlet holes, and a back cavity of each of the differential silicon-based microphone chips is communicated with one of the sound inlet holes at a corresponding position, wherein each of the differential silicon-based microphone chips includes a first microphone structure and a second microphone structure, all of the first microphone structures are electrically connected, and all of the second microphone structures are electrically connected.

In one possible embodiment, each of the differential silicon-based microphone chips includes a silicon substrate, and the second microphone structure and the first microphone structure are disposed to be stacked on one side of the silicon substrate, the silicon substrate has a via hole for forming the back cavity, and the via hole corresponds to both a main body of the first microphone structure and a main body of the second microphone structure, a side of the silicon substrate away from the second microphone structure is fixedly connected with the circuit board, and the via hole is communicated with one of the sound inlet holes.

In one possible embodiment, each of the differential silicon-based microphone chips specifically includes a lower back plate, a semiconductor diaphragm and an upper back plate that are disposed to stacked on the silicon substrate, gaps are formed between the upper back plate and the semiconductor diaphragm, and between the semiconductor diaphragm and the lower back plate, regions of the upper back plate and the lower back plate corresponding to the via hole are provided with air flow holes; the upper back plate and the semiconductor diaphragm constitute the main body of the first microphone structure, and the semiconductor diaphragm and the lower back plate constitute the main body of the second microphone structure.

In one possible embodiment, upper back plates of all the first microphone structures are electrically connected to form a first signal path, and lower back plates of all the second microphone structures are electrically connected to form a second signal path.

In one possible embodiment, semiconductor diaphragms of all the differential silicon-based microphone chips are electrically connected, and the semiconductor diaphragms are electrically connected with a constant voltage source.

In one possible embodiment, the silicon-based microphone device further includes a control chip located inside the sound cavity and connected with the circuit board, the upper back plate is electrically connected with one signal input end of the control chip, and the lower back plate is electrically connected with another signal input end of the control chip.

In one possible embodiment, the upper back plate comprises an upper back plate electrode, and the upper back plates of all of the first microphone structures are electrically connected through the upper back plate electrodes; and/or the lower back plate electrode includes a lower back plate electrode, and the lower back plates of all of the second microphone structures are electrically connected through the lower back plate electrodes; and/or the semiconductor diaphragm includes a semiconductor diaphragm electrode, and all of the semiconductor diaphragms are electrically connected through the semiconductor diaphragm electrodes.

In one possible embodiment, each of the differential silicon-based microphone chips further comprises a patterned first insulating layer, a patterned second insulating layer and a patterned third insulating layer, the silicon substrate, the first insulating layer, the lower back plate, the second insulating layer, the semiconductor diaphragm, the third insulating layer and the upper back plate are disposed to be stacked sequentially.

In one possible embodiment, the silicon-based microphone device has any one or more of the following arrangements: the differential silicon-based microphone chips are fixedly connected with the circuit board with silica gel; the shielding housing includes a metal housing, and the metal housing is electrically connected with the circuit board; the shielding housing is fixedly connected with one side of the circuit board with solder paste or conductive glue; and the circuit board includes a printed circuit board.

In a second aspect, an embodiment of the present disclosure also provides an electronic device including the silicon-based microphone device described in the first aspect.

The beneficial technical effects brought by the technical solutions provided in the embodiments of the present disclosure are that:

In the silicon-based microphone device provided in the embodiments of the present disclosure, by arranging at least two differential silicon-based microphone chips, and making the first microphone structures of the differential silicon-based microphone chips to be electrically connected and the second microphone structures of the differential silicon-based microphone chips to be electrically connected, when a sound wave from a same sound wave source enters the back cavity of each of the differential silicon-based microphone chips through each of the sound inlet hole, respectively, variations in capacitances generated in the first microphone structures due to the same sound wave have the same amplitude and the same sign. Similarly, variations in capacitances generated in the second microphone structures due to the same sound wave have the same amplitude and the same sign. The use of the plurality of differential silicon-based microphone chips may increase both of a sound signal and a noise signal. Since the variation of the sound signal is greater than that of the noise signal, common-mode noise may be reduced, and signal-to-noise ratio and acoustic overload point may be increased, thereby improving tone quality.

Additional aspects and advantages of the present disclosure will be set forth partially in the following description, which will be apparent from the following description, or learned by practice of the present disclosure.

BRIEF DESCRIPTION OF DRAWINGS

The above and/or additional aspects and advantages of the present disclosure will become apparent and readily understood from the following description of embodiments, taken in conjunction with the accompanying drawings, in which.

EXPLANATION OF REFERENCE NUMERALS IN DRAWINGS

Figure 1:
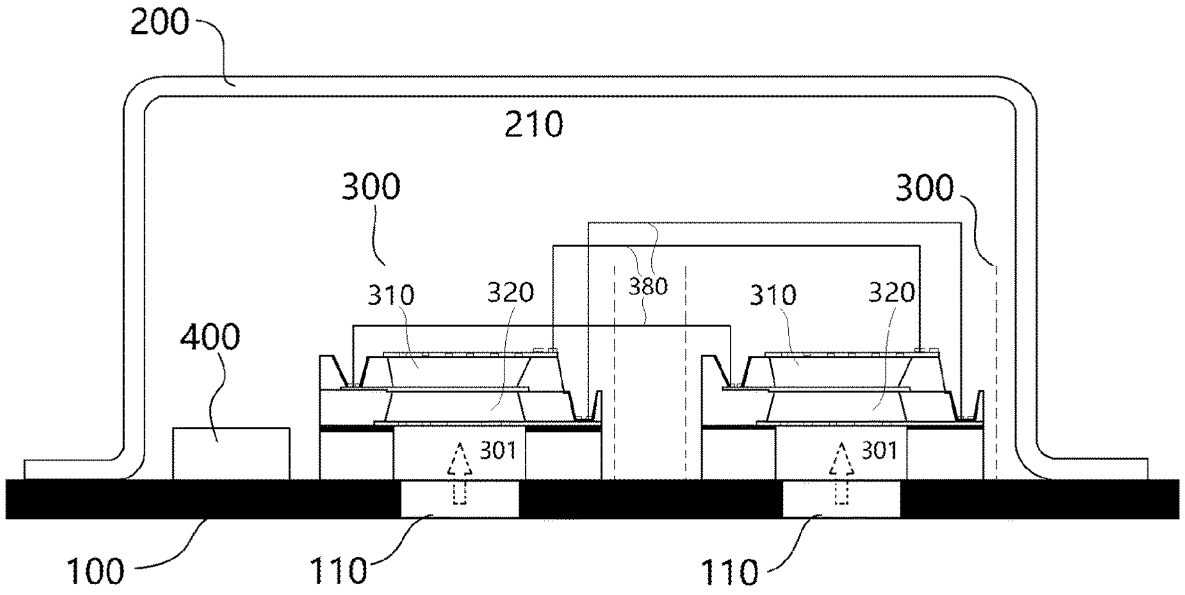
FIG. 1 is a schematic diagram of an internal structure of a silicon-based microphone device according to an embodiment of the present disclosure.

100: circuit board; 110: sound inlet hole;
200: shielding housing; 210: sound cavity;
300: differential silicon-based microphone chip; 301: back cavity;
310: first microphone structure; 311: upper back plate; 311*a*: upper airflow hole; 311*b*: upper back plate electrode; 312: upper air gap;
320: second microphone structure; 321: lower back plate; 321*a*: lower airflow hole; 321*b*: lower back plate electrode; 322: lower air gap;
330: semiconductor diaphragm; 331: semiconductor diaphragm electrode;
340: silicon substrate; 341: via;
350: first insulating layer;
360: second insulating layer;
370: third insulating layer;
380: wire;
400: control chip.

DETAILED DESCRIPTION OF EMBODIMENTS

The present disclosure is described in detail below, and examples of embodiments of the present disclosure are illustrated in the accompanying drawings, in which the same or similar reference numerals throughout refer to the same or similar components, or components having the same or similar functions. Also, detailed description of the well-known technologies is omitted if it is not necessary for illustrating features of the present disclosure. The embodiments described below with reference to the accompanying drawings are exemplary and are only used to explain the present disclosure, but not to be construed to be limiting thereof.

It is to be understood by those skilled in the art that all terms (including technical and scientific terms) used herein have the same meaning as commonly understood by one of ordinary skill in the art to which the present disclosure belongs unless otherwise defined. It is further to be understood that terms, such as those defined in a general dictionary, should be understood to have meanings consistent with meanings thereof in the context of the prior art, and should not be interpreted in an idealistic or overly formal meaning unless specifically defined as herein.

It is to be understood by those skilled in the art that singular forms “a”, “an”, and “the” used herein may also include plural forms unless expressly stated. It should be further understood that the word “include” or “comprise” used in the specification of the present disclosure refers to presence of the stated feature, integer, step, operation, element and/or component, but does not exclude presence or addition of one or more other features, integers, steps, operations, elements, components and/or a combination thereof. As used herein, the term “and/or” includes all or any one and all combination of one or more of the associated listed items.

The technical solutions of the present disclosure and how to solve the above-mentioned technical problems by the same are described in detail below with reference to embodiments.

As shown in FIG. 1, an embodiment of the present disclosure provides a silicon-based microphone device including: a circuit board 100, a shielding housing 200, and at least two differential silicon-based microphone chips 300 (only two differential silicon-based microphone chips 300 are shown in the drawings). The shielding housing 200 covers one side of the circuit board 100, and forms a sound cavity 210 of the silicon-based microphone device with the circuit board 100.

The circuit board 100 is provided with at least two sound inlet holes 110 (only two sound inlet holes 110 are shown in the drawings) thereon. The sound inlet holes 110 penetrate through the circuit board 100 to ensure that the external sound enters the differential silicon-based microphone chips 300 through the sound inlet holes 110. Each of the differential silicon-based microphone chips 300 is located inside the sound cavity 210. The differential silicon-based microphone chips 300 are arranged in a one-to-one correspondence with the sound inlet holes 110. The back cavity 301 of each of the differential silicon-based microphone chips 300 is communicated with a sound inlet hole 110 at the corresponding position.

Each of the differential silicon-based microphone chips 300 includes a first microphone structure 310 and a second microphone structure 320. All of the first microphone structures 310 are electrically connected, and all of the second microphone structures 320 are electrically connected.

In the silicon-based microphone device provided in this embodiment, by arranging at least two differential silicon-based microphone chips 300, and making all of the first microphone structures 310 of the differential silicon-based microphone chips 300 to be electrically connected, and all of the second microphone structures 320 of the differential silicon-based microphone chips 300 to be electrically connected, when a sound wave from the same sound wave source enters the back cavity 301 of each of the differential silicon-based microphone chips 300 through each of the sound inlet hole 110, variations in capacitances generated in the first microphone structures 310 due to the same sound wave have the same amplitude and the same sign. Similarly, variations in capacitances generated in the second microphone structures 310 due to the same sound wave have the same amplitude and the same sign. The use of the plurality of differential silicon-based microphone chips may increase both of the sound signal and the noise signal. Since variation of the sound signal is greater than that of the noise signal, common-mode noise may be reduced, and signal-to-noise ratio and acoustic overload point may be increased, thereby improving tone quality.

Specifically, when amplitudes of variations in capacitances of the plurality of differential silicon-based microphone chips 300 are superimposed, the increased amount in sensitivity (corresponding to the sound signal) is twice the increased amount of the noise signal. A case, in which variation in capacitance corresponding to the increased sound signal is 2, is illustrated as an example. The increased amount of the sensitivity signal (corresponding to the sound signal) is $20\times\log(2)=6$ dB, in which calculation is performed with log(2) being equal to 0.3; and the increased amount of the noise signal is $20\times\log(\sqrt{2})=10*\log(2)=3$ dB. Therefore, an increased signal-to-noise ratio is equal to the value obtained by subtracting the noise signal from the sensitivity, which is 3 dB, wherein the unit dB means decibel.

In this embodiment, the back cavity 301 of the differential silicon-based microphone chip 300 functions an entrance for the sound wave, and the sound wave enters the second microphone structure 320 and the first microphone structure 310 of the differential silicon-based microphone chip 300 through the back cavity 301, which may cause variations in capacitances of the second microphone structure 320 and the first microphone structure 310, respectively, thereby converting the acoustic signal into an electrical signal. In an embodiment, the cross-sectional shape of the back cavity 301 may be circular, oval or square.

It is to be noted that the silicon-based microphone device in FIG. 1 is illustrated as only including two differential silicon-based microphone chips 300. The two differential silicon-based microphone chips 300 include a first differential silicon-based microphone chip and a second differential silicon-based microphone chip, and the corresponding sound inlet holes 110 include the first sound inlet hole and the second sound inlet hole. The differential silicon-based microphone chip 300 on the left side in FIG. 1 is the first differential silicon-based microphone chip, and the differential silicon-based microphone chip 300 on the right side is the second differential silicon-based microphone chip.

Specifically, the first microphone structure 310 of the first differential silicon-based microphone chip is electrically connected with the first microphone structure 310 of the second differential silicon-based microphone chip, and the second microphone structure 310 of the first differential silicon-based microphone chip is electrically connected with the second microphone structure 310 of the second differential silicon-based microphone chip. The positional relationship between the first microphone structure 310 and the second microphone structure 320 in each of the differential silicon-based microphone chips 300 and the circuit board 100 is consistent.

In an embodiment, the circuit board 100 is a printed circuit board 100. Due to being a rigid structure, the printed circuit board 100 has a structural strength to support the shielding housing 200 and the differential silicon-based microphone chips 300.

In an embodiment, in order to improve an effect of shielding electromagnetic interference for the differential silicon-based microphone chips 300 inside the sound cavity 210, the shielding housing 200 is usually a metal housing made of conductive metal material.

In an embodiment, the shielding housing 200 is fixedly connected with the circuit board 100 with solder paste or conductive glue, thereby forming an electrical connection, which may prevent external interference.

Figure 2:
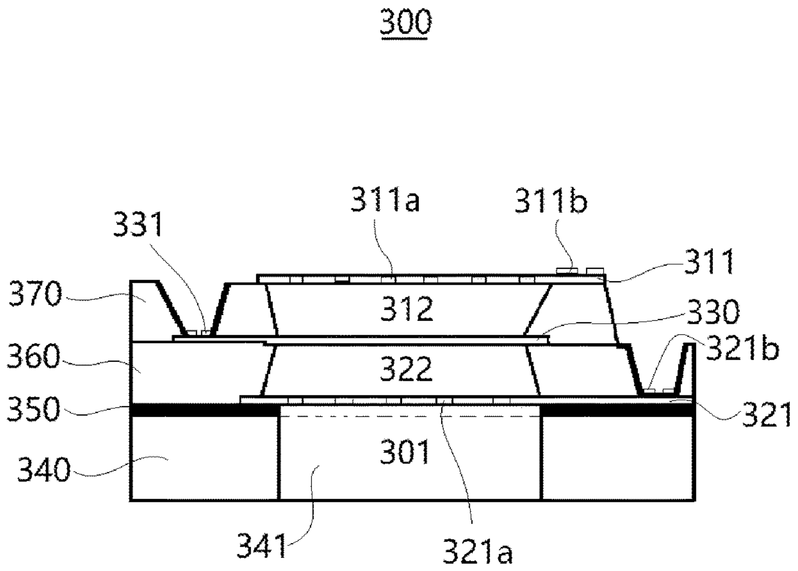
FIG. 2 is a schematic structural diagram of a single differential silicon-based microphone chip in a silicon-based microphone device according to an embodiment of the present disclosure.

In some embodiments, as shown in FIGS. 1 and 2, the differential silicon-based microphone chip 300 further includes a silicon substrate 340. The second microphone structure 320 and the first microphone structure 310 are disposed to be stacked on one side of the silicon substrate 340.

The silicon substrate 340 has a via hole 341 for forming the back cavity 301, and the via hole 341 corresponds to both main body of the first microphone structure 310 and main body of the second microphone structure 320, so as to ensure that the sound wave entering through the via hole 341 may cause variations in capacitances of the first microphone structure 310 and the second microphone structure 320.

One side of the silicon substrate 340 away from the second microphone structure 320 is fixedly connected with the circuit board 100. The via hole 341 is communicated with the sound inlet hole 110 at the corresponding position, so that the sound may enter the back cavity 301 through the sound inlet hole 110.

In this embodiment, the sound inlet hole 110 in the circuit board 100 is communicated with the back cavity 301 of the differential silicon-based microphone chip 300, and the sound is introduced into the semiconductor diaphragm 330 of the differential silicon-based microphone chip 300 through the sound inlet hole 110, causing vibration of the semiconductor diaphragm 330 to generate a sound signal.

In some embodiments, continuing to refer to FIGS. 1 2, the differential silicon-based microphone chip 300 further includes a lower back plate 321, a semiconductor diaphragm 330 and an upper back plate 311. The lower back plate 321, the semiconductor diaphragm 330 and the upper back plate 311 are disposed to be stacked on one side of the silicon substrate 340 away from the circuit board 100.

Gaps are formed between the upper back plate 311 and the semiconductor diaphragm 330 and between the semiconductor diaphragm 330 and the lower back plate 321. The regions of the upper back plate 311 and the lower back plate 321 corresponding to the via hole 341 are provided with air flow holes. The upper back plate 311 and the semiconductor diaphragm 330 form a capacitor structure with the gap therebetween, thereby constituting the main body of the first microphone structure 310. Likewise, the semiconductor diaphragm 330 and the lower back plate 321 form a capacitor structure with the gap therebetween, thereby constituting the main body of the second microphone structure 320.

Specifically, the semiconductor diaphragm 330 and the upper back plate 311 may be arranged in parallel and separated by an upper air gap 312, thereby forming the first microphone structure 310. The semiconductor diaphragm 330 and the lower back plate 321 may be arranged in parallel and separated by a lower air gap 322, thereby forming the second microphone structure 320. It could be understood that an electric field (non-conduction) is formed between the semiconductor diaphragm 330 and the upper back plate 311 and between the semiconductor diaphragm 330 and the lower back plate 321. Since the semiconductor silicon substrate 340 is provided with the via hole 341 for forming the back cavity 301, the sound wave may contact the semiconductor diaphragm 330 after passing through the back cavity 301 and the lower air flow holes 321*a* on the lower back plate 321.

In an embodiment, the material for forming the semiconductor diaphragm 330 may be polysilicon materials, and a thickness of the semiconductor diaphragm 330 is less than 1 micron, and thus, the semiconductor diaphragm 330 may be deformed even under an action of a relatively weak acoustic wave, and the sensitivity is relatively high. The upper back plate 311 and the lower back plate 321 are generally made of a material having strong rigidity and a thickness much larger than the thickness of the semiconductor diaphragm 330. A plurality of upper airflow holes 311*a* are formed on the upper back plate 311 by preforming etching, and a plurality of lower airflow holes 321*a* are formed on the lower back plate 321 by preforming etching. Therefore, when the semiconductor diaphragm 330 is deformed due to the action of the sound wave, neither the upper back plate 311 nor the lower back plate 321 may be affected to be deformed.

For a single differential silicon-based microphone chip 300, by applying a bias voltage between the semiconductor diaphragm 330 and the upper back plate 311, an upper electric field may be formed in the upper air gap 312 of the first microphone structure 310. Similarly, by applying a bias voltage between the semiconductor diaphragm 330 and the lower back plate 321, a lower electric field may be formed in the lower air gap 322 of the second microphone structure 320. Since a polarity of the upper electric field is opposite to that of the lower electric field, when the semiconductor diaphragm 330 is bent up and down under the action of the sound wave, the variation in capacitance of the first microphone structure 310 has a same amplitude as and an opposite sign to the variation in capacitance of the second microphone structure.

In an embodiment, the side of the silicon substrate 340 away from the lower back plate 321 is fixedly connected with the circuit board 100 with silica gel.

In some embodiments, as shown in FIG. 2, the silicon substrate 340 is arranged to be insulated from the lower back plate 321, the lower back plate 321 is arranged to be insulated from the semiconductor diaphragm 330, and the semiconductor diaphragm 330 is arranged to be insulated from the upper back plate 311.

Specifically, the lower back plate 321 is separated from the silicon substrate 340 by a patterned first insulating layer 350, the semiconductor diaphragm 330 is separated from the lower back plate 321 by a patterned second insulating layer 360, and the semiconductor diaphragm 330 is separated from the upper back plate 311 by a patterned third insulating layer 370, so that the silicon substrate 340, the first insulating layer 350, the lower back plate 321, the second insulating layer 360, the semiconductor diaphragm 330, the third insulating layer 370 and the upper back plate 311 are disposed to be stacked sequentially.

In an embodiment, each of the first insulating layer 350, the second insulating layer 360 and the third insulating layer 370 may be formed by forming an integrated film and then patterning the integrated film by an etching process to remove a portion of the integrated film corresponding to an area of the via hole 341 and an area for preparing an electrode.

Figure 3:
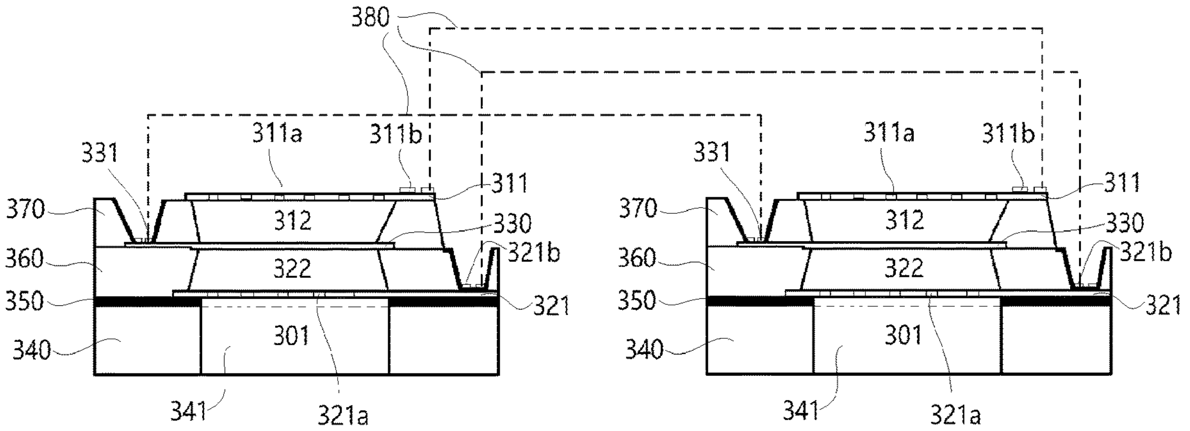
FIG. 3 is a schematic diagram of a connection between two differential silicon-based microphone chips in a silicon-based microphone device according to an embodiment of the present disclosure.

In some embodiments, as shown in FIG. 3, as for the plurality of differential silicon-based microphone chips 300 in the silicon-based microphone device, the upper back plates 311 of all of the first microphone structures 310 are electrically connected to form a first signal path, and the lower back plates 321 of all of the second microphone structures 320 are electrically connected to form a second signal path.

Specifically, the first signal path is used for a signal formed after the upper back plates 311 of all of the first microphone structures 310 being electrically connected, which corresponds to a sum of variations in capacitances between the upper back plates 311 of the first microphone structures 310 and corresponding semiconductor diaphragms 330 thereof, and input into a differential signal processing chip as one input. The second signal path is used for a signal formed after the lower back plates 321 of all of the second microphone structures 320 being electrically connected, which corresponds to a sum of variations in capacitances between the lower back plates 321 of the second microphone structures 320 and corresponding semiconductor diaphragms 330 thereof, and input into the differential signal processing chip as another input.

In some embodiments, the semiconductor diaphragms 330 of all of the differential silicon-based microphone chips 300 are electrically connected, and the semiconductor diaphragms 330 are electrically connected with a constant voltage source, such that a stable electric field is formed within the first microphone structure 310 and the second microphone structure 320. In an embodiment, the constant voltage source may have a zero voltage level.

On the basis of the above embodiments, as shown in FIG. 1, the silicon-based microphone device further includes a control chip 400, which is located inside the sound cavity 210 and is connected with the circuit board 100. The control chip 400 serves as a core component for differential signal processing, and one signal input end of the control chip 400 is electrically connected with the upper back plate 311 of one of the first microphone structures 310, so that the first signal path may be connected to the input end of the control chip 400. Another signal input end of the control chip 400 is electrically connected with the lower back plate 321 of one of the first microphone structures 310, so that the second signal path is connected to the input end of the control chip 400. The control chip 400 performs differential signal processing on two signals from the two signal paths so as to improve the signal-to-noise ratio.

In an embodiment, the control chip 400 is implemented with an application specific integrated circuit (ASIC) chip, which may be customized according to design requirements of the microphone. The ASIC chip is a differential amplifying signal processing chip, and pins thereof are reserved to be connected to the first signal path and the second signal path.

In an embodiment, the control chip 400 is also usually fixed on the circuit board 100 with silica gel or red gum.

In some embodiments, as shown in FIG. 3, the upper back plate 311 includes an upper back plate electrode 311*b*. The upper back plate electrodes 311*b* of all of the first microphone structures 310 are electrically connected through wires 380.

In an embodiment, the lower back plate 321 includes a lower back plate electrode 321*b*. The lower back plate electrodes 321*b* of all of the second microphone structures 320 are electrically connected through the wires 380.

In an embodiment, the semiconductor diaphragm 330 includes a semiconductor diaphragm electrode 331. All of the semiconductor diaphragm electrodes 331 are electrically connected through the wires 380.

For a single differential silicon-based microphone chip 300, by applying a bias voltage between the semiconductor diaphragm 330 and the upper back plate 311, specifically, by applying a bias voltage to the diaphragm electrode connected with the semiconductor diaphragm 330 and the upper back plate electrode 311*b* connected with the upper back plate 311, an upper electric field may be formed in the upper air gap 312 of the first microphone structure 310. Similarly, by applying a bias voltage between the semiconductor diaphragm 330 and the lower back plate 321, specifically, by applying a bias voltage to the diaphragm electrode connected with the semiconductor diaphragm 330 and the lower back plate electrode 321*b* connected with the lower back plate 321, a lower electric field may be formed in the lower air gap 322 of the second microphone structure 320. Since the polarity of the upper electric field is opposite to that of the lower electric field, when the semiconductor diaphragm 330 is bent up and down under the action of the sound wave, the variation in capacitance of the first microphone structure 301 has the same amplitude as and an opposite sign to the variation in capacitance of the second microphone structure 302.

With regard to the connection between two differential silicon-based microphone chips 300 illustrated in FIG. 3, an electrical connection is achieved between the semiconductor diaphragm electrode 331 of the first differential silicon-based microphone chip (left side) and the semiconductor diaphragm electrode 331 of the second differential silicon-based microphone chip (right side) through the wire 380, an electrical connection is achieved between the upper back plate electrode 311*b* of the first differential silicon-based microphone chip and the upper back plate electrode 311*b* of the second differential silicon-based microphone chip through the wire 380, and an electrical connection is achieved between the lower back plate electrode 321*b* of the first differential silicon-based microphone chip and the lower back plate electrode 321*b* of the second differential silicon-based microphone chip through the wire 380.

When a first sound wave entering through the first sound inlet hole and a second sound wave entering through the second sound inlet hole originate from the same sound wave source, based on the connection between two differential base microphone chips according to the embodiment of the present disclosure, the generated variation in capacitance of the first microphone structure 310 of the first differential silicon-based microphone chip due to the first sound wave has the same amplitude and the same sign as the generated variation in capacitance of the first microphone structure 310 of the second differential silicon-based microphone chip due to the second sound wave. Similarly, the generated variation in capacitance of the second microphone structure 320 of the first differential silicon-based microphone chip due to the first sound wave has the same amplitude and the same sign as the generated amount of variation in capacitance of the second microphone structure 320 of the second differential silicon-based microphone chip due to the second sound wave. Since two first microphone structures 310 are connected in parallel and two second microphone structures 320 are connected in parallel, by using the silicon-based microphone device packaged with two differential silicon-based microphone chips 300 in this embodiment, the ratio of the sound signal to the noise signal may be increased, thereby reducing common-mode noise, and then achieving a higher signal-to-noise ratio of the silicon-based microphone.

It is to be noted that the silicon-based microphone devices in the above-mentioned embodiments of the present disclosure is illustrated by using a differential silicon-based microphone chips 300 implemented with a single diaphragm (for example, the semiconductor diaphragm 330) and two back electrodes (for example, the upper back plate 311 and the lower back plate 321) as an example. In addition to an arrangement of the single diaphragm and two back electrodes, the differential silicon-based microphone chip 300 may also be implemented by two diaphragms and a single back electrode, or other differential structures.

Based on the same inventive concept, an embodiment of the present disclosure further provides an electronic device, including the silicon-based microphone device described in any one of the described embodiments as above.

The electronic device provided in this embodiment includes a silicon-based microphone device having at least two differential silicon-based microphone chips 300. In the silicon-based microphone device, first microphone structures 310 of all of the differential silicon-based microphone chips 300 are electrically connected, and second microphone structures 320 of all of the differential silicon-based microphone chips 300 are electrically connected. Both of the sound signal and the noise signal may be increased. Since variation of the sound signal is greater than that of the noise signal, common-mode noise may be reduced and signal-to-noise ratio may be improved.

In an embodiment, the electronic device in the above embodiment may be a mobile phone, a voice recorder or a translator.

In the description of the present disclosure, it is to be understood that orientations or positional relationships indicated by the terms “center”, “upper”, “lower”, “front”, “rear”, “left”, “right”, “vertical”, “horizontal”, “top”, “bottom”, “inside”, “outside” and so on are based on the orientations or positional relationships shown in the accompanying drawings, which are only for convenience of describing the present disclosure and simplifying the description, rather than indicating or implying that the device or element referred necessarily has a particular orientation, needs to be constructed and operated in a particular orientation, and therefore, those terms should not be construed as a limitation to the present disclosure.

The terms “first” and “second” are used for describing purposes only, and should not be understood as indicating or implying relative importance or implying the number of technical features indicated. Thus, a feature defined by “first” or “second” may expressly or implicitly include one or more of such features. In the description of the present disclosure, unless stated otherwise, “plurality of” means two or more than two.

In the description of the present disclosure, it is to be noted that, unless otherwise expressly specified and limited, the terms “installed”, “connected” and “connection” should be understood in a broader sense, for example, a connection may be a fixed connection or a removable connection, or an integral connection; a connection may be directly connection, or indirectly connection through an intermediate medium, or may be an internal communication of two elements. The specific meanings of the above terms in the present disclosure may be understood by those ordinary skilled in the art according to specific situations.

In the description of the present specification, the particular features, structures, materials or characteristics may be combined in any suitable manner in any one or more of the embodiments or examples.

The above description is only some embodiments of the present disclosure, it is to be noted that, some improvements and modifications may also be made by those ordinary skilled in the art without departing from the principle of the present disclosure. These improvements and modifications should also be considered to be within the scope of the present disclosure.

What is claimed is:

1. A silicon-based microphone device, comprising:

a circuit board provided with at least two sound inlet holes;

a shielding housing, covering one side of the circuit board and forming a sound cavity with the circuit board;

at least two differential silicon-based microphone chips, each of which is located inside the sound cavity, wherein the differential silicon-based microphone chips are respectively disposed at the sound inlet holes, and a back cavity of each of the differential silicon-based microphone chips is communicated with one of the sound inlet holes at a corresponding position; and wherein each of the differential silicon-based microphone chips includes a first microphone structure and a second microphone structure, all of the first microphone structures are electrically connected, and all of the second microphone structures are electrically connected.

2. The silicon-based microphone device of claim 1, wherein each of the differential silicon-based microphone chips comprises a silicon substrate, and the second microphone structure and the first microphone structure are stacked on one side of the silicon substrate;

the silicon substrate has a via hole for forming the back cavity, and the via hole corresponds to both a main body of the first microphone structure and a main body of the second microphone structure; and a side of the silicon substrate away from the second microphone structure is fixedly connected with the circuit board, and the via hole is communicated with one of the sound inlet holes.

3. The silicon-based microphone device of claim 2, wherein each of the differential silicon-based microphone chips comprises a lower back plate, a semiconductor diaphragm and an upper back plate;

the lower back plate, the semiconductor diaphragm and the upper back plate are stacked on the silicon substrate; gaps are formed between the upper back plate and the semiconductor diaphragm, and between the semiconductor diaphragm and the lower back plate; regions of the upper back plate and the lower back plate corresponding to the via hole are provided with air flow holes; and the upper back plate and the semiconductor diaphragm constitute the main body of the first microphone structure; and the semiconductor diaphragm and the lower back plate constitute the main body of the second microphone structure.

4. The silicon-based microphone device of claim 3, wherein upper back plates of all of the first microphone structures are electrically connected to form a first signal path; and lower back plates of all of the second microphone structures are electrically connected to form a second signal path.

5. The silicon-based microphone device of claim 4, wherein the semiconductor diaphragms of all of the differential silicon-based microphone chips are electrically connected, and the semiconductor diaphragms are electrically connected with a constant voltage source.

6. The silicon-based microphone device of claim 5, further comprising a control chip located inside the sound cavity and connected with the circuit board; and the upper back plate is electrically connected with one signal input end of the control chip, and the lower back plate is electrically connected with another signal input end of the control chip.

7. The silicon-based microphone device of claim 5, wherein the upper back plate comprises an upper back plate electrode, and the upper back plate electrodes of all of the first microphone structures are electrically connected;

and/or, the lower back plate electrode includes a lower back plate electrode, and the lower back plate electrodes of all of the second microphone structures are electrically connected;

and/or, the semiconductor diaphragm includes a semiconductor diaphragm electrode, and all of the semiconductor diaphragm electrodes are electrically connected.

8. The silicon-based microphone device of claim 3, wherein each of the differential silicon-based microphone chips further comprises a patterned first insulating layer, a patterned second insulating layer and a patterned third insulating layer;

the silicon substrate, the first insulating layer, the lower back plate, the second insulating layer, the semiconductor diaphragm, the third insulating layer and the upper back plate are disposed to be stacked and sequential.

9. The silicon-based microphone device of claim 1, wherein the silicon-based microphone device has any one or more of the following arrangements:

the differential silicon-based microphone chips are fixedly connected with the circuit board with silica gel;

the shielding housing includes a metal housing, and the metal housing is electrically connected with the circuit board;

the shielding housing is fixedly connected with the one side of the circuit board with solder paste or conductive glue; and the circuit board includes a printed circuit board.

10. An electronic device comprising the silicon-based microphone device as claimed in claim 1.

* * * * *